Patented June 7, 1932

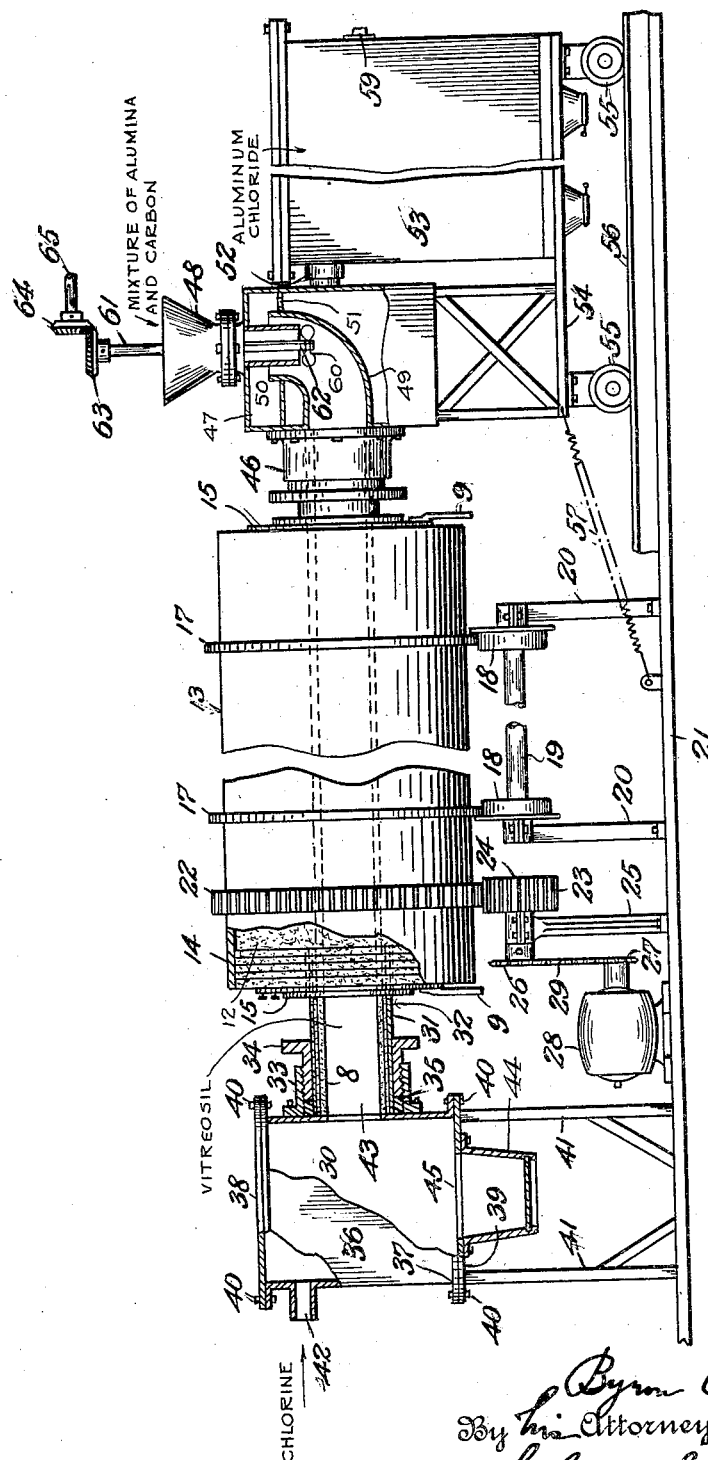

1,862,298

UNITED STATES PATENT OFFICE

BYRON ELLSWORTH CARL, OF NEW YORK, N. Y.

PROCESS OF MAKING ALUMINUM CHLORIDE

Application filed May 2, 1925, Serial No. 27,344. Renewed February 3, 1931.

My invention relates to a process for the manufacture of aluminum chloride and its novelty resides in the steps of said process.

The object of this invention is the production of aluminum chloride ($AlCl_3$) by a safe, positive and economical method.

This application includes subject matter found in my earlier application, Serial No. 514,210 filed Nov. 10, 1921.

The formation of various metallic chlorides occurs in both nature and the arts. Such natural occurrences as chloride of silver and chloride of sodium (common salt) are valuable and very useful. Chlorine like the other elements of the halogen group (bromine, iodine and fluorine) forms anhydrous binary compounds with the metallic elements. To form a binary compound, of a member of the halogen group, such as chlorine with a metal such as aluminum would seemingly require simply bringing them together under conditions required to produce the reaction. It has been long known that aluminum chloride could be so produced but the cost of first producing the metallic aluminum has proven a barrier to its general use. The constantly increasing call for cheap chloride ($AlCl_3$) frequently causes a renewal of the efforts to produce it by such direct means, but the cost of the metal together with difficulties of manipulation controlling the gas have caused lessening of the efforts in this direction. It is evident that it is not essential to use both the metal and the chlorine in the free elemental state and that one or both may be used in the form of a compound which under the conditions employed yields the desired compound. For instance, the aluminum may enter the field of reaction as alumina ($Al_2O_3$) or some other form and the chlorine as an element. So long as the resultant product yields aluminum chloride ($AlCl_3$) the object sought has been accomplished.

For the past few years many research workers have been busy and numerous patents have been issued for the production of aluminum chloride ($AlCl_3$) by methods and combinations which differ from the direct method of causing a union of elemental aluminum and chlorine.

Almost without exception such patents set forth the great difficulties and dangers attending these efforts. For while the final desired product aluminum chloride ($AlCl_3$) is easily and safely handled, some of the methods and combinations employed produce oxychlorides and other volatile gases which are difficult and dangerous to handle.

The danger in the operation has come principally from the formation of toxic oxychlorides, such as $COCl_2$, which are likely to be formed under the conditions imposed. In the process herein outlined I have eliminated this danger by opposing a regulated current of chlorine to the line of travel of a mixture of alumina and carbon; the rates of the opposing feeds being such that the chlorine is never in excess of the amount which the aluminum in the mixture absorbs for the formation of aluminum chloride when the operation is carried out in a suitable apparatus and under the conditions of temperature necessary for the reaction. When the flow of chlorine meets the feed of mixed alumina and carbon, oxychlorides may be formed as per the following reaction:

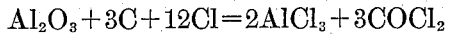

$$Al_2O_3 + 3C + 12Cl = 2AlCl_3 + 3COCl_2$$

The $COCl_2$ formed continues its movement as a gas and is further contacted with the alumina of the oncoming feed of the solids. A secondary reaction then occurs and the second member of the above equation will react as follows:

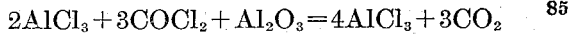

$$2AlCl_3 + 3COCl_2 + Al_2O_3 = 4AlCl_3 + 3CO_2$$

This last equation shows that such oxychloride as may have been formed in the earlier period of contact of the chlorine with the solids is later altered by its subsequent contact with the alumina to anhydrous aluminum chloride.

In my process I thus provide that such oxychloride as may be formed has no opportunity to escape as such, but is eliminated by the further contact which is produced by the described manner and conditions of bringing the ingredients together.

It is also apparent great care is needed in the selection of the material to be used in the construction of the apparatus. Under the influence of heat in the presence of carbon, chlorine will not only unite with alumina or some alumina yielding compound but with many other elements and compounds and so complicate the reaction as to produce undesirable products and also destroy the apparatus. As the theory of the reactions has long been known to chemists it is evident that the greater part of the research work for production of aluminum chloride ($AlCl_3$) must be in discovering the conditions under which the reaction can safely be carried out, and in discovering how to control these conditions.

The conditions constituting a safe positive and efficient method of producing anhydrous aluminum chloride ($AlCl_3$) are both positive and negative in character, and are as follows:

(1) The materials from which the aluminum chloride ($AlCl_3$) is produced must be thoroughly dehydrated and intimately mixed to insure efficiency. Gases and liquids which are miscible are easily evenly intermingled. Solids require special mixing and exceedingly fine grinding. A mixture of solids and gases requires especial care or channelling occurs and part of the gas escapes without contact.

(2) The temperature required to incite and maintain the reaction must be attained and maintained.

(3) The materials constituting the apparatus must be inert and impervious to the action of the ingredients and product under the conditions imposed.

The limitations imposed by these conditions can only be discovered by previous knowledge or much experimentation. I have found in respect to these points that intimacy of contact can be maintained by the manner of feed in a continuous operation taking care that the chlorine shall not be in excess as it is the troublesome part of the ingredients. Exact ratios of all according to chemical formulas will produce the ideal efficiency if absolute intimacy is maintained. Here the troublesome element chlorine is carried in quantity to that point. The temperature must exceed the temperature of vaporization of the product desired, aluminum chloride ($AlCl_3$); and not exceed its point of attack on the containing reaction chamber. This I have discovered as hereinafter set forth.

I have found that fused silica such as "Vitreosil" furnishes a very satisfactory material for the reaction chamber or space, because it resists the action of chlorine and carbon even at temperatures in excess of those needed. With these points defined I will outline the conduct of the method.

In carrying out my process I provide a quantity of a mixture of alumina ($Al_2O_3$) and carbon. The alumina ($Al_2O_3$) may be present as such or as a material which yields alumina ($Al_2O_3$) in my process when under influence of heat. The alumina must be very finely ground.

The carbon is used as a very fine powder, even as fine as lamp black. The finer the carbon and the alumina the more complete the uniformity of the mixture. The carbon should be present at least in sufficient amounts to satisfy the oxygen present. I also provide a regulated feeding device so arranged as to feed into the reaction chamber a regulated supply of aluminum oxide and carbon. The amount of carbon mixed with the aluminum oxide always being at least fully sufficient to satisfy the reactions. From a separate source I provide a regulated feed of chlorine or a compound of chlorine to the reaction chamber. The solids and the chlorine are not contacted until they enter the reaction chamber. While they may both enter at the same end of the reaction chamber I prefer that they enter at opposite ends. The solids entering at one end of the chamber are fed through it by the revolving motion at a rate influenced by the speed of revolution and may also be fed through at any desired rate by the deflection of the chamber from the horizontal, as in a cement rotary kiln.

The chlorine enters preferably at the opposite end from the solid feed end and passes through the reaction chamber being uniformly heated thereby and the evolved gases pass on through the chamber and are conducted to the condensers. The solids thus enter the line of travel of the gases and move on in a direction opposite to the flow of the gases, this movement being produced by the conveying action of the revolving cylinder or by any other suitable means. By this arrangement or manner of controlling the opposing feeds, the uniformly heated gases are constantly meeting fresh portions of the oncoming uniformly heated solids with which they must commingle while passing through and over said solids until they leave the reaction chamber. Thus the reaction chamber is arranged to receive the feed of the solids and gas in such a way as to provide for their constant convenient and consequent further intermingling during their passage through the zone of reaction so as to insure not only the original contacting but also a recontacting of the gas with the solids. The reaction chamber is preferably fused silica (Vitreosil). It may set within a resistance coil surrounded by heat, be heated internally or heated in any other suitable way and be so insulated and encased that it can be revolved, thus providing that new surfaces of the mixture of the uniformly heated solids are exposed to and constantly coming in contact and recontact with the uniformly heated chlorine. In carrying out my process it must be kept in mind that the reaction set forth is largely exothermic.

If, however, it is found desirable to maintain the reaction chamber in a fixed position then the further intermingling of the mixed heated solids with the heated gas may be accomplished by stirring or agitating these mixed solids in the line of flow of the gas feed or in a manner opposing the flow of the gas.

Referring to the drawing it is a perspective of my device showing certain portions being broken in order to shorten the drawing, and with certain portions broken away in order to show the construction.

In the drawing 8 is a reaction chamber, cylindrical in shape, which is made of fused silica, such as "Vitreosil", which is the trade name of a suitable fused silica material which I have found in actual practice will serve my purpose. This reaction chamber should be of substantial length, but not of a very large diameter. A resistance coil of usual construction is wound around said reaction chamber 8, and a suitable fire proofing cement is used to coat the resistance coil so as to hold it securely in place on the reaction chamber 8. Suitable fireproof brick 12 are then inserted, so as to entirely surround the cement, into a cylindrical iron tube 13 which has been slipped over said reaction chamber 8, thereby surrounding the brick 12 and holding them in place so that the entire cylindrical tube 13 can be packed in a similar way with brick 12 so as to effect an adequate heat insulation to the reaction chamber 8 and the resistance coil. Both ends of the cylindrical tube 13 are packed with a suitable number of asbestos circular plates 14, having a circular opening at the center adapted to fit over the reaction chamber 8, and to each end is adapted to be rigidly secured brass heads 15 having circular openings at their center adapted to fit over the reaction chamber 8, and to which heads 15 are secured the terminals of the resistance coil 9. Brushes 16 connected to a source of power, not shown herein, are also mounted so as to make a constant brush contact with said plates 15 as they rotate. Trunnions 17 are secured to the outside of the cylinder 13 so as to make a rolling contact with wheels 18 which are mounted on a shaft 19 which is mounted at each end so as to rotate freely in uprights 20 which are rigidly secured to a base member 21, thereby effecting the support of the cylinder 13 and the reaction chamber 8 carried therein.

A driven gear 22 is also rigidly secured to the cylinder 13 so as to engage a driving gear 23, which is mounted on a shaft 24, which shaft is so mounted in the head of a bracket 25 as to rotate freely therein, said bracket 25 being rigidly secured to the base member 21. A sprocket 26 is rigidly secured to the shaft 24 at the opposite end from the gear 23, and a sprocket 27 is mounted on a motor 28 so that it is driven thereby, said motor 28 being rigidly secured to the base member 21. A chain 29 is mounted over the sprockets 26 and 27 so that as sprocket 27 is driven by the motor 28 the chain 29 is thereby driven, which in turn drives the sprocket 26. The rotation of sprocket 26 also rotates the shaft 24, to which it is rigidly mounted, and the gear 23 which is rigidly secured to the shaft 24 rotates therewith. The rotation of gear 23, which is in mesh with gear 22, drives said gear 23, thereby rotating the cylinder 13 and the reaction chamber 8 and other parts mounted in said cylinder 13.

The reaction chamber 8 projects beyond the plates 15 a material distance at each end, and at the lower end is connected to a chlorine chamber 30, having an asbestos coating 31 over said projection and a suitable metal cylinder 32 over said asbestos coating 31, both 31 and 32 extending into the cylinder 13 as far as the asbestos plates so extend. The reaction chamber 8 is connected to the chlorine chamber 30 by means of a stuffing box joint 33 of usual construction, which is rigidly secured to the chlorine chamber 30 and which has a screw member 34 adapted to be screwed down in the usual manner on a packing 35 so as to effect a flexible non-leaking joint. The manner of connection of the reaction chamber 8 to the chlorine chamber 30 enables any variation made by the reaction chamber 8 in rotating from its true or fixed position horizontally to be taken up by the members 31 and 32 against the asbestos plates 14 at one end of the connection, and the packing 35 at the other end, so as to prevent any possibility of breaking the reaction chamber tube 8.

The chamber 30 is an air-tight chamber having a cylindrical body member 36 with upturned edges 37 rigidly clamped to top member 38 and bottom member 39 by means of suitable bolts 40. The chlorine chamber 30 is rigidly mounted on supports 41 which are rigidly secured to the base member 21. The chlorine chamber 30 has an inlet opening 42 from the source of chlorine supply, and an outlet 43 into the reaction chamber 8. It also has a waste material container 44 rigidly secured to the bottom 39, and the bottom 39 has an opening 45 permitting all waste material to fall into 44 under normal conditions, but said opening 45 is controlled by a slide which can be closed so that the bottom of the container 44 may be opened in order to empty 44 without interfering with the contents of the container 30.

The end of the reaction chamber 8 projects from the cylinder 13 at the opposite end from the chlorine chamber 30 a suitable distance so as to extend into a stuffing box connection 46, which extension and connection is the same as the connection to 30 in construction, and 46 is rigidly secured to a feed chamber 47 for the solids. Said fuel chamber 47 has a funnel element 48 made integral therewith, and said funnel 48 projects into a larger inner feed elbow 49, which is made integral with said chamber 47, so that vapors coming into 49 may pass up into the head 50 of the chamber 47 and may thence pass out through opening 51 and outlet 52 into a suitable condensing chamber 53. The feed chamber 47 is rigidly mounted on a car 54 which has two pairs of wheels 55 mounted thereon in the usual manner so as to run on a pair of tracks 56. The condensing chamber 53 is also rigidly mounted on said car 54, and a spiral spring 57 is connected to said car at one end and to the base member 21 at the opposite end, so that it is always under tension and drawing the car 54 toward the reaction chamber 8, thereby effecting a close contact with the end of the reaction chamber 8 which projects to the solid feed chamber 47 so that it is held in close contact therein, together with the stuffing box connection 46.

The condensing chamber 53 has waste collector 58 at the bottom which are also adapted to be opened to remove the waste in a similar manner to the waste container 44 of the chlorine chamber 30 so as not to interfere with the carrying on of the process. The condensing chamber 53 also has an outlet 59 adapted to be used for drawing off the anhydrous metallic chloride. The outer bodies of both the solid feed chamber 47 and the condensing chamber 53 are constructed in the same manner as the chlorine chamber 30.

A suitable agitator 60 is mounted on a shaft at 62 in the funnel 48, and a shaft 61 has a crown gear 63 rigidly secured to its upper end which meshes with the crown gear 64, which is rigidly secured to a shaft 65 which is driven by some suitable power, not shown herein.

The device above described is claimed in Patent No. 1,564,302 granted to Wohlers, Dec. 8, 1925.

I claim:

1. The process of making anhydrous aluminum chloride ($AlCl_3$) in a revolving externally heated fused silica reaction chamber by passing into the chamber from separate sources a regulated supply of chlorine and an intimate mixture of alumina ($Al_2O_3$) and carbon, and collecting and condensing the vapors of aluminum chloride ($AlCl_3$) evolved.

2. The process of making anhydrous aluminum chloride ($AlCl_3$) in a revolving externally heated fused silica reaction chamber by passing into the chamber from separate sources a regulated supply of chlorine and an intimate mixture of dehydrated bauxite and carbon, and collecting and condensing the vapors of aluminum chloride ($AlCl_3$) evolved.

3. The process of making anhydrous aluminum chloride ($AlCl_3$) in a revolving externally heated fused silica reaction chamber by passing into the chamber from separate sources a regulated supply of chlorine and an intimate mixture of dehydrated alumina yielding compound and carbon, and collecting and condensing the vapors of aluminum chloride ($AlCl_3$) evolved.

4. The process of making anhydrous aluminum chloride ($AlCl_3$) in a revolving externally heated fused silica reaction chamber by passing into the chamber from opposing sources a regulated supply of chlorine and an intimate mixture of an alumina yielding compound and carbon, so that the alumina yielding compound and carbon are always in excess of the chlorine, and collecting and condensing the vapors of aluminum chloride ($AlCl_3$) evolved.

5. The process of making anhydrous aluminum chloride ($AlCl_3$) in a revolving, externally heated fused silica reaction chamber by passing into the chamber from opposing sources a regulated supply of chlorine and an intimate mixture of dehydrated bauxite and carbon, so that the mixture is always in excess of the chlorine, and collecting and condensing the vapors of aluminum chloride ($AlCl_3$) evolved.

6. The process of making anhydrous aluminum chloride ($AlCl_3$) in a revolving externally heated fused silica reaction chamber by passing into the chamber from separate sources a regulated supply of chlorine and an intimate mixture of dehydrated alumina and carbon, so that the mixture is always in excess of the chlorine, and collecting and condensing the vapors of aluminum chloride ($AlCl_3$) evolved.

7. The process of making anhydrous aluminum chloride, free from toxic oxychloride, which comprises bringing together, heating and maintaining at the necessary temperature to secure the desired reaction opposing feeds of chlorine and a mixture of alumina and carbon in such proportions that the chlorine is never in excess of the quantity required for the formation of aluminum chloride and keeping the gases formed in the reaction in further contact with the alumina so that oxychlorides which may have been formed will be altered and the discharged aluminum chloride freed from such contamination.

8. The process of making anhydrous aluminum chloride ($AlCl_3$) in a revolving externally heated reaction chamber which is inert and impervious to the action of the gases at the temperatures required by passing into the chamber from separate sources a regulated supply of chlorine and an intimate mixture of alumina ($Al_2O_3$) and carbon, and collecting and condensing the vapors of aluminum chloride ($AlCl_3$) evolved.

9. The process of making anhydrous aluminum chloride, free from toxic oxychloride, which comprises bringing together opposing feeds of chlorine and a mixture of alumina yielding compound and carbon in such proportions that the chlorine is never in excess of the quantity required for the formation of aluminum chloride and keeping the gases formed in the reaction in further contact with the alumina so that oxychlorides which may have been formed will be altered and the discharged aluminum chloride freed from such contamination.

10. The process of making anhydrous aluminum chloride ($AlCl_3$) in a revolving externally heated reaction chamber which is inert and impervious to the action of the gases at the temperatures required by passing into the chamber from separate sources a regulated supply of chlorine and an intimate mixture of alumina yielding compound and carbon, and collecting and condensing the vapors of aluminum chloride ($AlCl_3$) evolved.

11. The process of making anhydrous aluminum chloride, free from toxic oxychloride, which comprises bringing together, heating and maintaining at the necessary temperature to secure the desired reaction opposing feeds of chlorine and dehydrated bauxite and carbon in such proportions that the chlorine is never in excess of the quantity required for the formation of aluminum chloride and keeping the gases formed in the reaction in further contact with the alumina so that oxychlorides which may have been formed will be altered and the discharged aluminum chloride freed from such contamination.

12. The process of making anhydrous aluminum chloride, free from toxic oxychloride, which comprises bringing together, heating and maintaining at the necessary temperature to secure the desired reaction opposing feeds of chlorine compound and a mixture of alumina and carbon in such proportions that the chlorine compound is never in excess of the quantity required for the formation of aluminum chloride and keeping the gases formed in the reaction in further contact with the alumina so that oxychlorides which may have been formed will be altered and the discharged aluminum chloride freed from such contamination.

In testimony whereof I affix my signature.

BYRON ELLSWORTH CARL.